United States Patent [19]

Miura et al.

[11] Patent Number: 5,190,434
[45] Date of Patent: Mar. 2, 1993

[54] ARTICLE SUPPLIER

[75] Inventors: Toshihiko Miura; Sachio Umetsu, both of Kawasaki, Japan

[73] Assignee: Canon Kabushiki Kaisha, Tokyo, Japan

[21] Appl. No.: 830,488

[22] Filed: Feb. 6, 1992

Related U.S. Application Data

[63] Continuation of Ser. No. 493,437, Mar. 14, 1990, abandoned.

[30] Foreign Application Priority Data

| Mar. 14, 1989 | [JP] | Japan | 1-059607 |
| Mar. 15, 1989 | [JP] | Japan | 1-061028 |
| Feb. 16, 1990 | [JP] | Japan | 2-35277 |
| Feb. 17, 1990 | [JP] | Japan | 2-36721 |

[51] Int. Cl.$^5$ .................................. B65G 60/00
[52] U.S. Cl. ............................ 414/609; 414/794.2; 414/933; 414/416
[58] Field of Search ............. 414/609, 331, 401, 416, 414/788.4, 788.7, 795.8, 796.7, 794.2, 926, 929, 933; 198/465.1

[56] References Cited

U.S. PATENT DOCUMENTS

| 3,342,349 | 9/1967 | Sheldon et al. | 414/795.8 |
| 3,533,517 | 10/1970 | Heide | 414/926 X |
| 3,856,158 | 12/1974 | Currie | 414/926 X |
| 4,205,934 | 6/1980 | Pantin et al. | 414/933 X |
| 4,277,216 | 7/1981 | Lindberg | 414/331 |
| 4,358,236 | 11/1982 | Dudley | 414/796.7 X |
| 4,373,846 | 2/1983 | Charbonnet | 414/331 |
| 4,457,658 | 7/1984 | Meylan | 414/795.8 X |
| 4,557,656 | 12/1985 | Ouellette | 414/929 X |
| 4,588,341 | 5/1986 | Motoda | 414/331 X |
| 4,687,403 | 8/1987 | Motoda | 414/788.4 |
| 4,946,340 | 8/1990 | Murphy et al. | 414/416 X |
| 4,979,870 | 12/1990 | Mojden et al. | 414/788.4 |
| 5,096,369 | 3/1992 | Ouellette | 414/929 X |

FOREIGN PATENT DOCUMENTS

| 60-213630 | 10/1985 | Japan . |
| 62-029335 | 2/1987 | Japan . |
| 63-106214 | 5/1988 | Japan . |
| 1366356 | 1/1988 | U.S.S.R. | 414/788.4 |

Primary Examiner—David A. Bucci
Assistant Examiner—James Keenan
Attorney, Agent, or Firm—Fitzpatrick, Cella, Harper & Scinto

[57] ABSTRACT

An article supplier is provided with a first elevator for supplying articles contained in a pallet to a robot, a second elevator for discharging an empty pallet, and a driving mechanism for seesaw-moving the first and second elevators with the pallet being moved to an article supply position and a discharge position for the empty pallet by the elevators. In addition, a plurality of detectors detect the positions of the elevators and the raising and lowering of the first and second elevators is based on signals from the detectors.

2 Claims, 12 Drawing Sheets

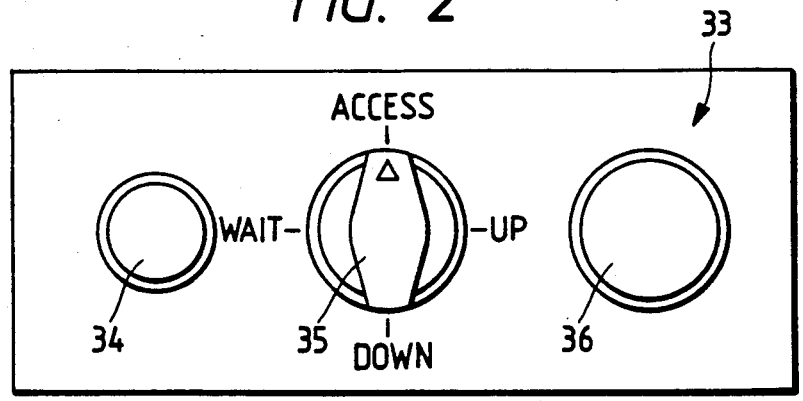
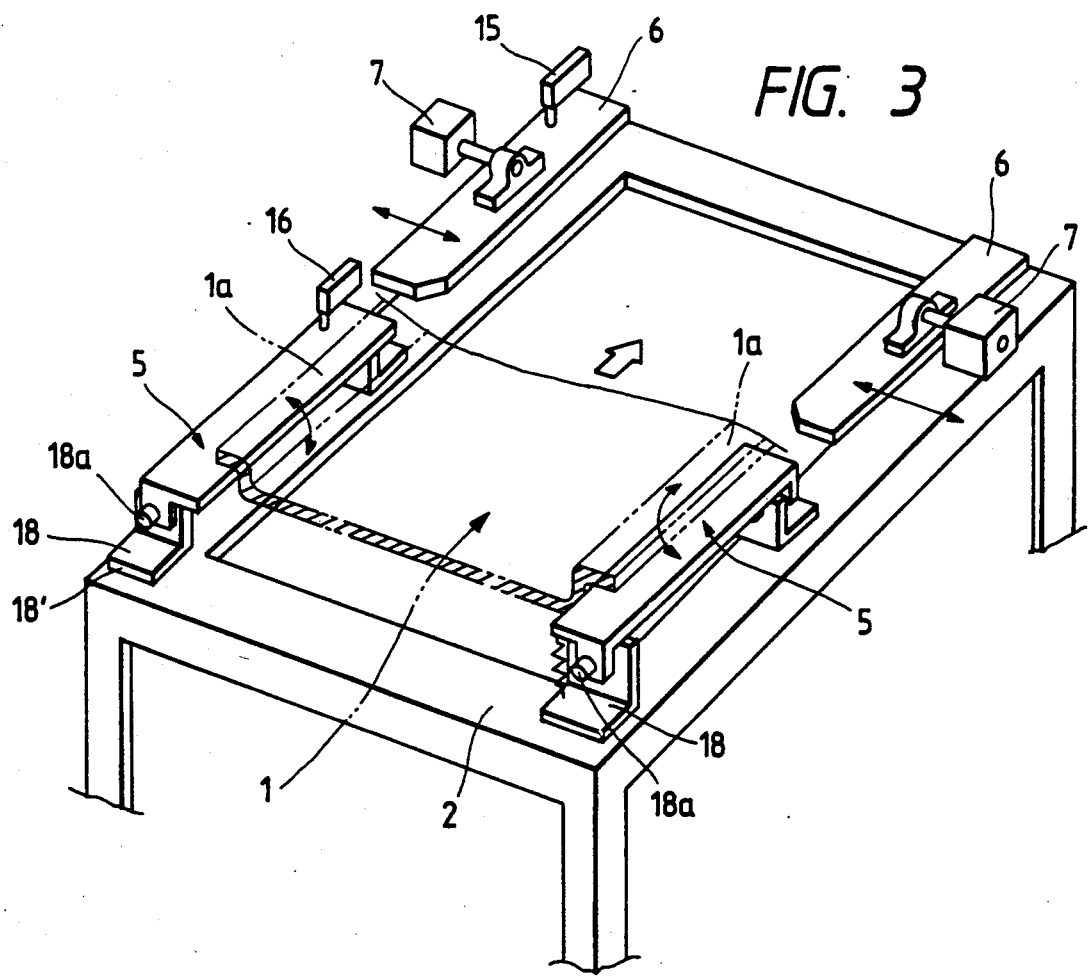

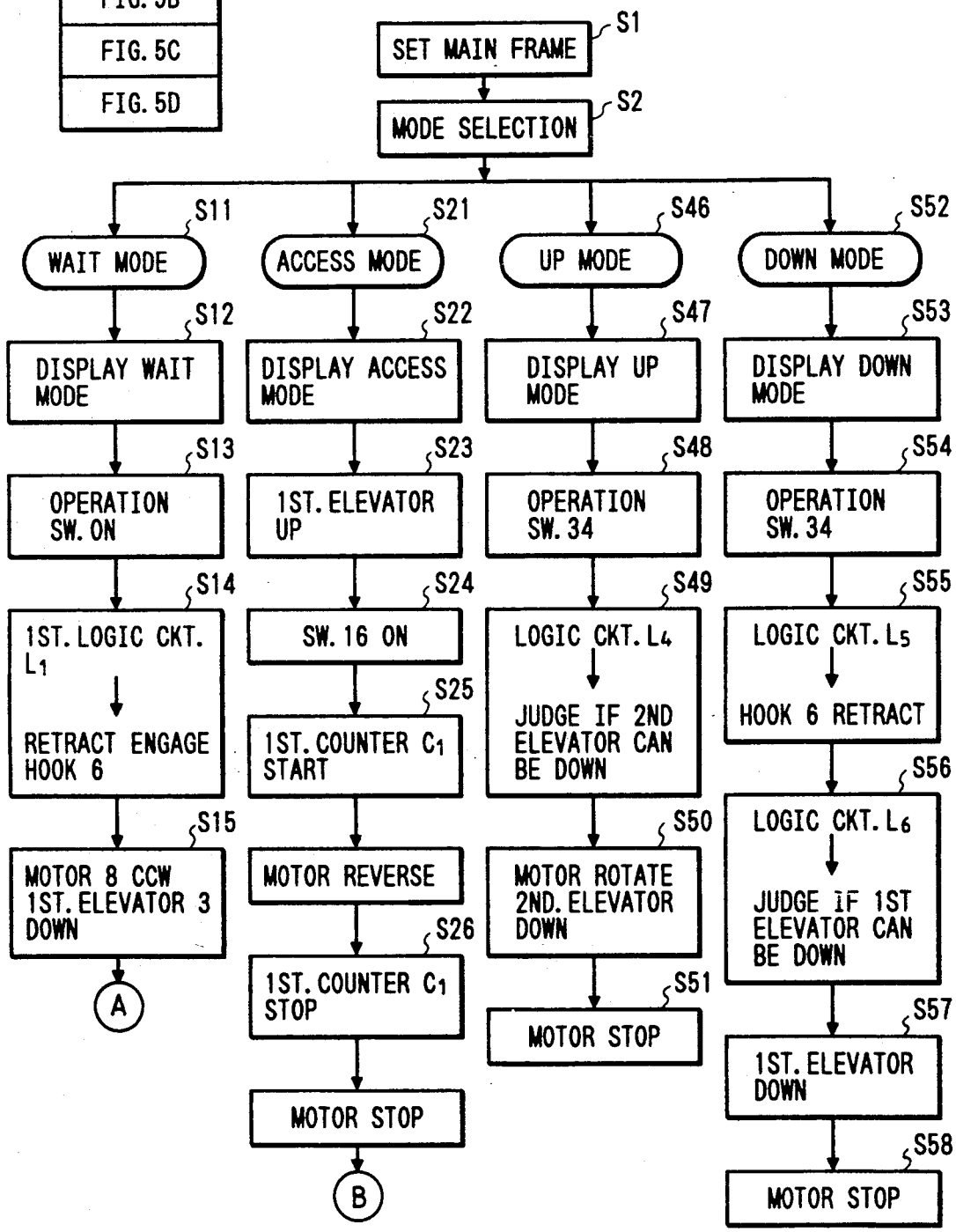

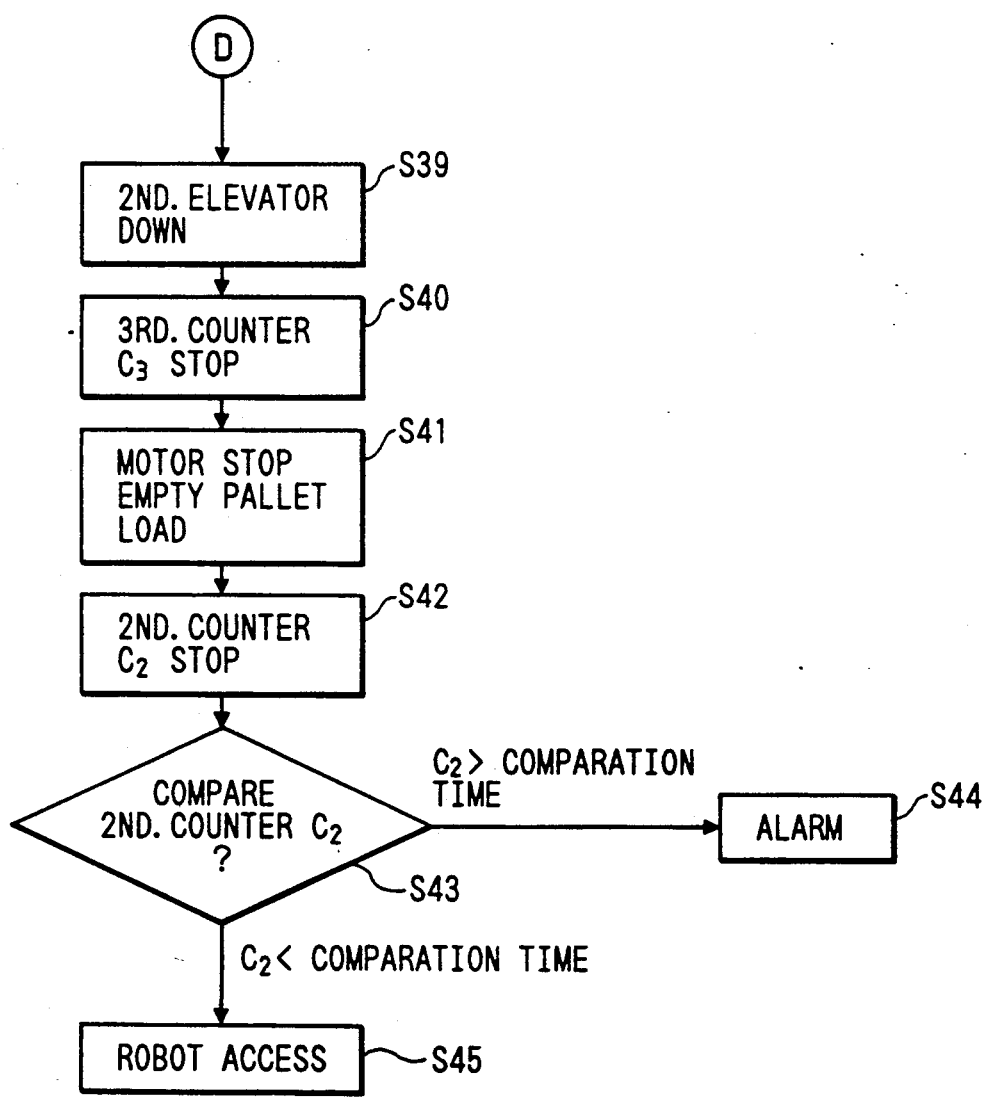

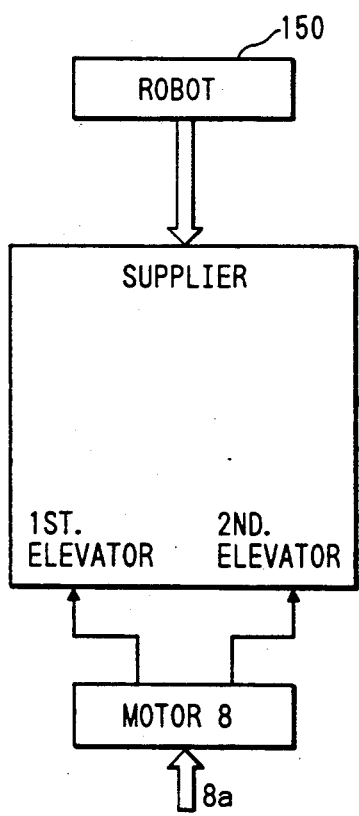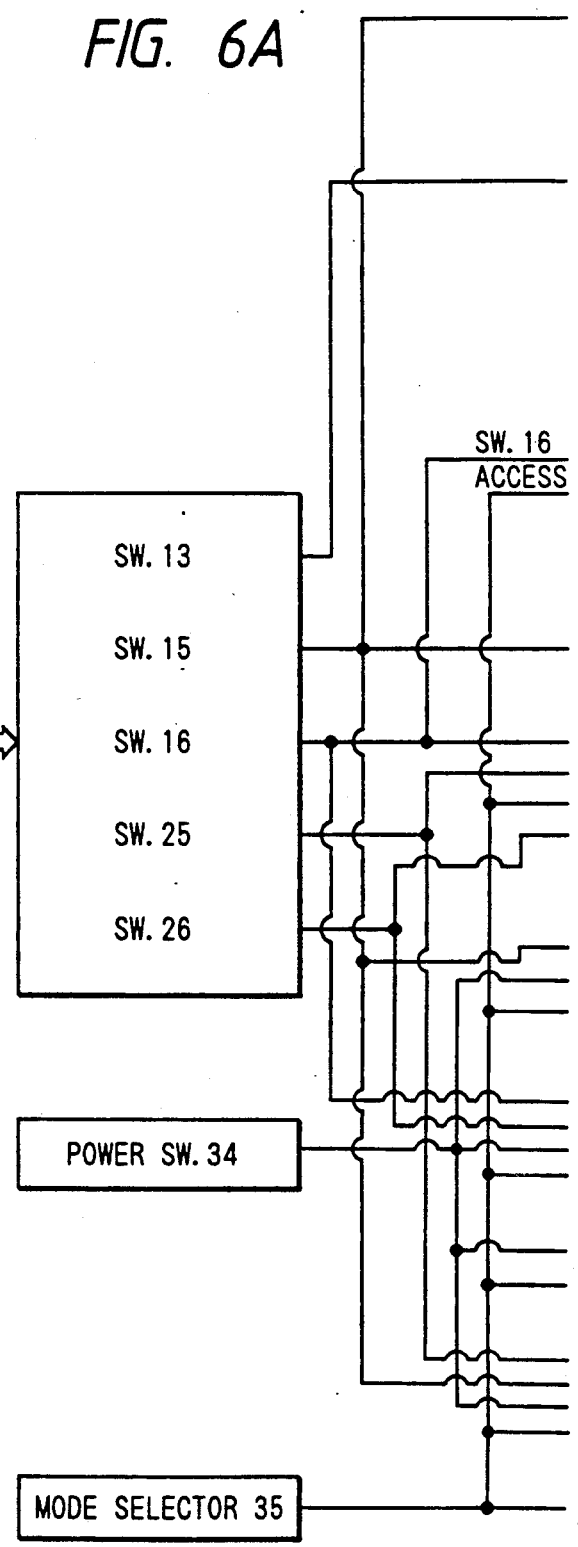

ARTICLE SUPPLIER

This application is a continuation of application Ser. No. 07/493,437 filed Mar. 14, 1990, now abandoned.

BACKGROUND OF THE INVENTION

1. Field of the Invention

This invention relates to a pallet supplier installed in various instruments such as the machine tools of automatic working machines, automatic assembling machines, etc. for supplying pallets to the various instruments.

2. Related Background Art

Generally, a pallet supplier for supplying pallets to various instruments such as the machine tools of automatic working machines, automatic assembling machines, etc. is accurately positioned and installed relative to the machine tool of a working machine, an assembling machine or the like and is provided as an installed type to provide the assembly accuracy, for example, by a robot apparatus. Also, as regards the working and assembling processes in a factory, there are cases where the installation locations of working machines, assembling machines, etc. differ due to limitations in the sizes and installation conditions of respective working and assembling facilities, and in such cases, in order to convey articles, i.e., workpieces, the workpieces are contained in a pallet, whereafter the pallet is placed on an unmanned conveyor or a pallet supplier, which is then conveyed by man power.

FIG. 8 of the accompanying drawings is a side view showing an example of the construction of a pallet supplier according to the prior art. In FIG. 8, pallets 101 are placed at an upper position and a lower position in a supplier 122 for supplying and conveying the pallets 101 by elevator means, not shown, and are conveyed.

On the other hand, a robot apparatus 150 having a robot hand 150h mounted thereon is provided on top of an instrument 170 such as a machine tool or an assembling machine, and workpieces contained in the pallets 101 may be moved to a jig pallet 18 for assembly by the robot hand 150h as indicated by an arrow, and a conveyor 120 provided with a stopper 124 for receiving the pallets 101 and a conveyor 119 provided with a stopper 123 for discharging the pallets 101 are provided between the supplier 122 and the instrument 170 in such a manner that portions thereof are carried on a conveyor bed 130. The pallets 101 may be vertically driven by an elevator 125.

As regards the operation of the pallet supplier constructed as described above, the conveying apparatus 122 comprising an unmanned conveyor is moved to a positioning position in a direction perpendicular to the plane of the drawing sheet of FIG. 8, whereafter the lower pallet 101 in the supplier 122 is moved to the location at which the stopper 124 of the conveyor 120 for receiving the pallet 101, and thereafter the stopper 124 is released and the pallet 101 is moved to the location of the elevator 125, whereafter the pallet 101 is elevated to a work position, and workpieces in the pallet 101 are moved to the jig pallet 18 by the robot hand 150h as indicated by the arrow. When the number of the workpieces remaining in the pallet 101 becomes null in this manner, the elevator 125 is lowered to the level of the conveyor 119, and the pallet 101 is moved to a position in which the right end thereof bears against the stopper 123, whereafter the stopper 123 is released and the pallet 101 is moved to the upper position in the supplier 122, thus terminating the work.

Also, a conveying system for conveying a number of products by the use of a tray, which is provided with an elevator for supplying the tray to a product working station and an elevator for discharging the tray and in which these elevators are individually controlled in movement, is disclosed in Japanese Laid-Open Patent Application No. 60-213630.

Further, an apparatus for carrying a tray containing articles therein by a truck and conveying the tray to a working station, which is equipped with means for gripping the tray, means for supporting the tray until the work is completed in the working station, means for receiving from the supporting means the tray on which the work has been completed in a space portion provided within the apparatus body adjacent to a wagon mounting portion and conveying the tray downwardly, and means for returning the downwardly conveyed tray to the wagon and which is designed such that a preparatory tray and a work tray are pre-mounted on said gripping means and said supporting means, respectively, is shown in Japanese Laid-Open Patent Application No. 63-106214.

Furthermore, an apparatus which is provided with a mechanism for transferring a part box containing parts therein to a part supplying station and a discharge mechanism for discharging the part box which has become empty, and whose space is made small by transferring the part box three-dimensionally is disclosed in Japanese Patent Publication No. 62-29335.

SUMMARY OF THE INVENTION

It is a first object of the present invention to provide an apparatus which has first elevator means for conveying a pallet containing articles therein to a position for supplying the articles to an assembling machine such as a robot, and second elevator means for delivering an empty pallet to a pallet discharge position and discharging the empty pallet, said first elevator means and said second elevator means being disposed adjacent to each other and being operatively associated with each other in a seesaw-like fashion, whereby said first and second elevator means can be driven by a single driving means, and which is provided with detecting means for detecting the elevated and lowered positions of each of said elevator means, whereby the elevation or lowering of said first and second elevator means is effected to thereby accomplish the supply and discharge of the pallet efficiently.

It is a second object of the present invention to propose an apparatus in which the drive force of said driving means is obtained from a motor and the seesaw driving of said first and second elevator means is effected by forward and reverse revolutions of said motor.

It is a third object of the present invention to provide a supplier in which said first and second elevator means are designed to be driven in a seesawlike fashion and where said first elevator means is moved and articles in the last assembly cycle are contained in the pallet on said first elevator means, when there occurs the necessity of replacing the articles on the pallet urgently, such as changing the kind of assembled machine, said first elevator means may be arbitrarily moved to enable a new pallet to be placed onto said first elevator means.

It is a fourth object of the present invention to provide a pallet supplier in which when there occurs the necessity of urgently removing empty pallets piled on said second elevator means for discharging empty pallets, said second elevator means may be arbitrarily moved to enable the empty pallets to be taken out.

It is a further object of the present invention to provide a pallet supplier in which said first and second elevator means are designed to be driven in a seesaw-like fashion and which is provided with empty pallet detecting means for detecting the movement of empty pallets from an article supply position to an empty pallet discharge position and a counter operable by the detection signal of said empty pallet detecting means and in which the property of transferring the empty pallets onto said second elevator means is detected within a predetermined count time of said counter to thereby enable the empty pallets to be discharged smoothly.

It is still a further object of the present invention to propose a pallet supplier which is provided with logic means for logically calculating the signal of detecting means for detecting the elevated and lowered positions of said first and second elevator means, whereby the change-over control of the elevation and lowering by said driving means can be accomplished accurately.

Another task of the present invention is the alarming function of an article supplier. An article supplier suitable for the application of this task is an article supplier which, as will be described later in an embodiment, is provided with first elevator means for supplying articles contained in pallets to a robot, second elevator means for discharging empty pallets, driving means for seesaw-moving said first and second elevator means, the pallets being moved to an article supply position and an empty pallet discharge position by said elevator means, and a plurality of detecting means for detecting the positions of said elevator means, whereby the elevation and lowering of said first and second elevator means may be accomplished by the signals of said detecting means.

The above-described article supplier is designed such that the first elevator means for supplying loaded pallets and the second elevator means for discharging empty pallets effect elevation and lowering in a seesaw-like fashion with the pallets piled therein. In the above-described supplier, if the aligned state of the piled pallets is destroyed or some of the pallets fly out, the upward and downward movements of the elevator means will be hindered, thus particularly resulting in a hindrance to the article supply to the robot or an influence upon the next step of the working process.

Another task of the present invention is the provision of an apparatus in which, in order to cope with the above-noted problem, the upward and downward movements of the elevator means are time-controlled to thereby discriminate the abnormal state of the apparatus.

Also, as regards the working and assembling processes in a factory, there are cases where the installation locations of working machines, assembling machines, etc. differ due to limitations in the sizes and installation conditions of respective working and assembling facilities, and in such cases, in order to convey articles, i.e., workpieces, the workpieces are contained in a pallet, whereafter the pallet is carried on an unmanned conveyor or a pallet supplier, i.e., a supply vehicle, and is conveyed, for example, to a robot apparatus, whereafter the positional accuracy thereof relative to the robot apparatus is secured.

That is, the accuracy of the relative position of the supply vehicle and the robot apparatus is secured by the positioning structure of the pallet supplier, but there is known a method whereby usually a guide portion is provided on the robot apparatus side, while a guided portion guided by this guide portion is provided on the supply vehicle carrying pallets thereon and the guided portion of the supply vehicle is caused, for example, to ride onto the guide portion provided on the robot apparatus, thereby securing the accuracy of the relative position.

However, since the positioning structure of the pallet supplier according to the prior art has been designed as described above, there has been the problem that the supporting surface of the pallet does not become horizontal and the gripping of an article on the supporting surface of the pallet is not successfully accomplished to thereby hinder the next process and the problem that the positioning is not automatically effected to thereby make the operation difficult.

Accordingly, the positioning structure of the pallet supplier of the present invention has been made in view of the above-noted problems, and an object thereof is to provide the positioning structure of a pallet supplier in which the supporting surface of a pallet is made substantially horizontal so as not to adversely affect the next process and moreover positioning is automatically effected to facilitate the operation.

BRIEF DESCRIPTION OF THE DRAWINGS

FIG. 2 is a view taken along line A—A of FIG. 1 and showing the operation panel 33 of the pallet supplier.

FIG. 3 is a pictorial perspective view showing a set of engage members 5 and a set of engage hooks 6.

DESCRIPTION OF THE PREFERRED EMBODIMENTS

1) Description of the Apparatus Construction

Figure 1:
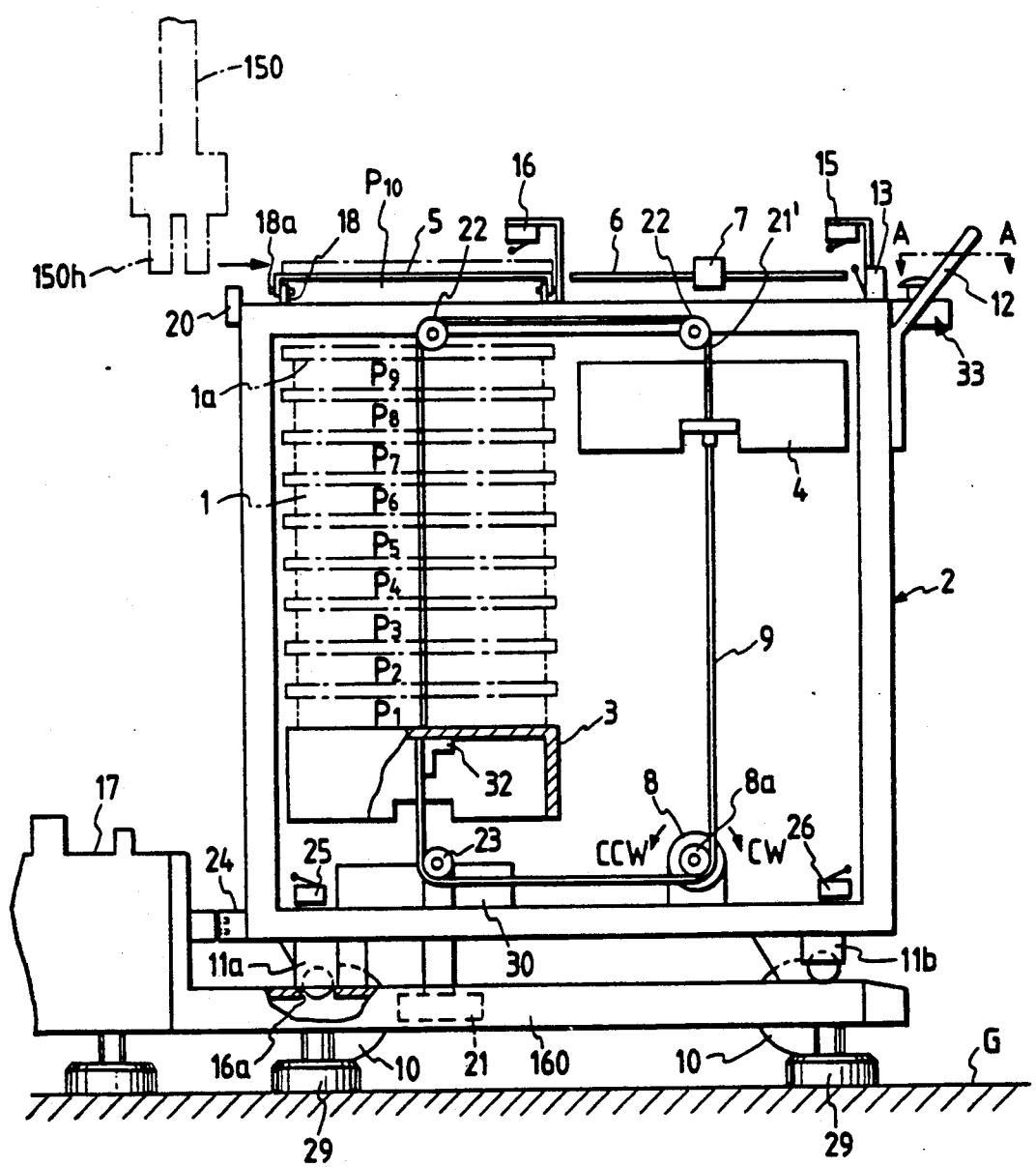
FIG. 1 is a side view of a pallet supplier according to an embodiment of the present invention schematically showing the construction thereof.

An embodiment of the present invention will hereinafter be described in detail with reference to the drawings. FIG. 1 is a side view of the pallet supplier of the present invention and schematically shows the construction thereof. In this figure, a robot apparatus 150 indicated by dot-and-dash lines and movable on a moving rail 17 is provided with a robot hand 150h, and pallets 1 indicated by dot-and-dash lines and containing therein a number of workpieces to be assembled by the robot apparatus 150 are piled above a floor surface G, and are supported on the supporting surface of a first elevator 3 for pallet supply while keeping their piled condition.

First and second elevators 3 and 4 for elevating and lowering the thus piled pallets 1 are provided within a body 2 so that the pallets 1 may be placed onto the supporting surface of the first elevator 3 by man power or an inserting mechanism constructed as a discrete unit while keeping their shown piled condition.

A motor 8 for driving these elevators 3 and 4 upwardly and downwardly is fixed on the bottom surface of the body 2, and a timing belt 9 adapted to partly mesh with the output shaft pulley 8a of the motor 8 has its direction changed by an idler 23 rotatable relative to the body 2, as shown, and the opposite ends of the timing belt are fixed to the bottom surfaces of the elevators 3 and 4 through brackets 32.

On the other hand, two idlers 22 are rotatably provided within the body 2, and a wire 21' is guided by these two idlers 22 and has its opposite ends secured to the upper surface portions of the elevators 3 and 4 in such a manner as to suspend the elevators 3 and 4. As a result, when the output shaft pulley 8a of the motor 8 is rotatively driven counter-clockwise (CCW), the elevator 3 is further lowered, while the elevator 4 is further elevated and thus, the first elevator 3 and the second elevator 4 are moved in a seesaw-like fashion by driving means (the motor 8, the belt 9 and a motor driving circuit which will be described later).

When conversely, the output shaft pulley 8a of the motor 8 is rotatively driven clockwise (CW), the elevator 3 is elevated, while the elevator 4 is lowered.

Limit switches 15 and 16 provided on the body 2 through brackets are disposed above these elevators 3 and 4, respectively, so that the elevated positions of the elevators can be detected. Further, limit switches 25 and 26 provided on the body 2 through brackets are disposed below the elevators 3 and 4, respectively, so that the lowered positions of the elevators 3 and 4 can be detected.

Four casters 10 for moving on the ground and two casters 21 for horizontal guiding indicated by broken lines are provided at the four corners of the bottom surface of the body 2, as shown. The moving rail 17 and ball casters 11a, 11b for coupling-positioning are disposed at the corner portions of the bottom surface of the body 2 with a level difference therebetween, and a pair of substantially L-shaped position frames 116 are provided on a side of the rail 17, as shown. Each of these position frames 116 is formed with an engagement hole 16a at a location corresponding to the ball caster 11a so that with the body 2 moved and set at the shown position, the ball caster 11a may be engaged with the engagement hole 16a to thereby accomplish positioning automatically and that with the body 2 and the moving rail 17 coupling-positioned, the part supporting surfaces of the pallets 1 may be parallel to the floor surface G, i.e., horizontal.

An LED display device 20 for displaying the operative condition is further provided on the left upper portion of the body 2 and a power supply plug 24 for supplying electric power from the moving rail 17 is provided on the left lower portion of the body 2.

Figure 6B:
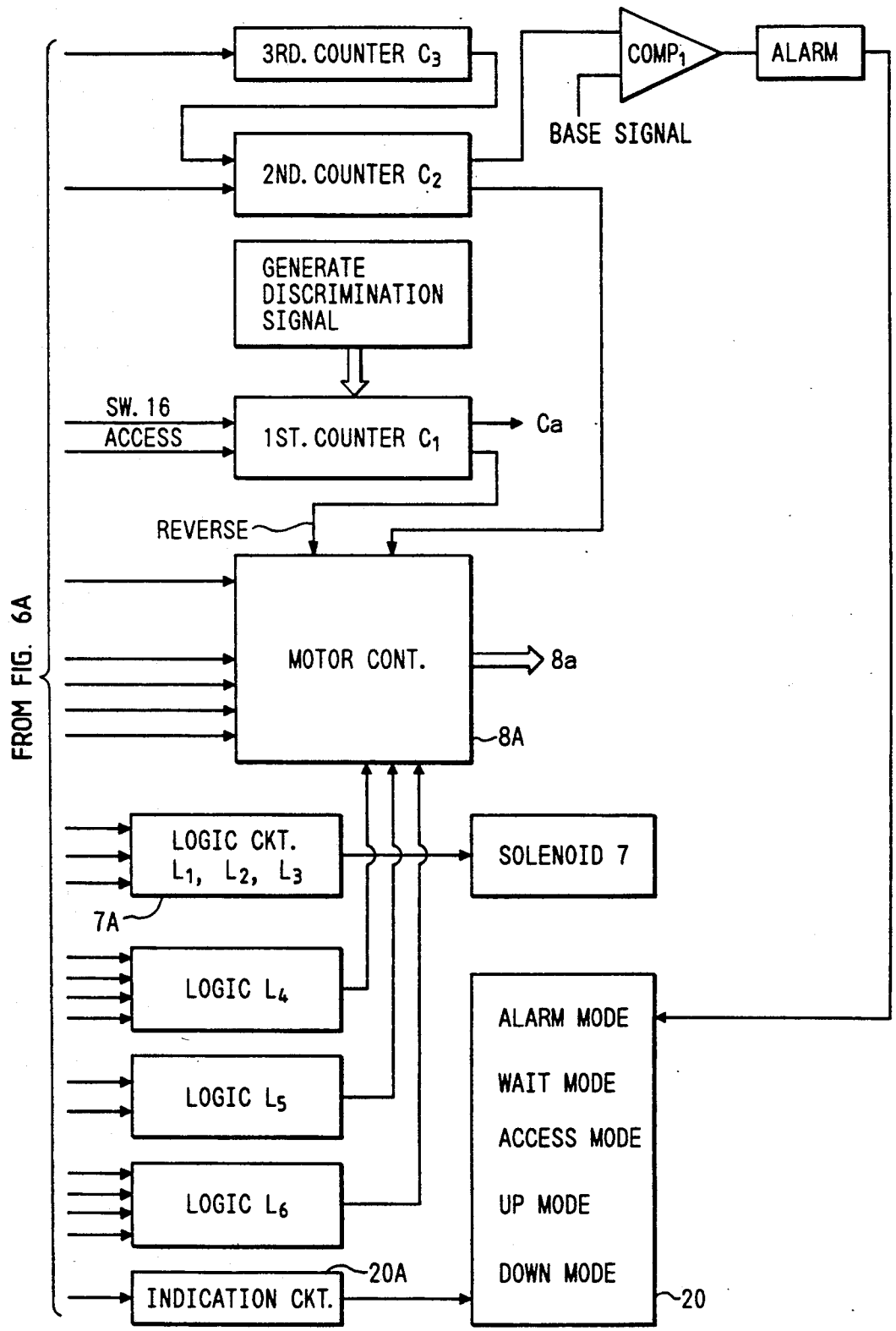
FIG. 6 is a block diagram.

A controller 30 containing counters $C_1$-$C_3$, etc. shown in FIG. 6 is provided in the lower portion of the body 2 so that connection with the robot apparatus 150 may be made through a connector, while the controller may govern the control which will be described later.

Furthermore, a handle 12 is provided on the right upper portion of the body 2 so that the body 2 can be easily moved by the use of this handle 12.

An operation panel 33 is provided substantially in the central portion of the handle 12 so that the operator may perform various operations by operating this operation panel.

FIG. 2 is a view taken along line A—A of FIG. 1 and showing the operation panel 33 of the pallet supplier. Referring to FIG. 2, a starting switch 34 for starting the body 2, a mode switch 35 for selecting the elevator 3 to one of the preparatory mode, the access mode, the elevated mode and the lowered mode, and an emergency stop switch 36 are provided on the operation panel 33, as shown.

Also, a set of engage members 5 which are in a positional relation for automatically engaging the flange portions 1a of the pallet 1 and a set of engage hooks 6 are movably provided on the opposite edge portions of the upper surface of the body 2 (FIG. 3).

FIG. 3 is a pictorial perspective view showing the set of engage members 5 and the set of engage hooks 6. Referring to FIG. 3, actuators 7 such as motors or solenoids for moving the engage hooks 6 in and out are provided on respective ones of the set of engage hooks 6 guided on the body 2 in the directions of arrows, and by the movement of these engage hooks 6, there are brought about a state in which the engage members engage the flange portions 1a of the pallet 1 and a state in which the engage members do not engage the flange portions 1a so that the pallet 1 may be brought into a state in which it is transferred onto the elevator 4 and a state in which it is not transferred onto the elevator 4.

On the other hand, the engage members 5 are pivotally moved by the pivot shafts 18a of rotational brackets 18 provided on the body 2 as shown and are pivotally moved in the directions of arrows by the flange portions 1a of the pallet 1 bearing against the engage members, but except during the pivotal movement, the lower surfaces of the engage members 5 are brought into contact with the rising end portions of the rotational brackets 18, as shown, with a result that the engage members can carry the flange portions 1a of the pallet 1 indicated by dots-and-dash lines.

Figure 4A:
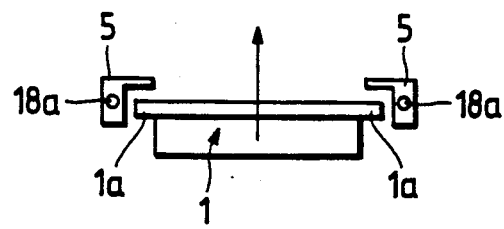
FIGS. 4A, 4B, 4C and 4D illustrate the operation of the engage members 5.

FIGS. 4A, 4B, 4C and 4D illustrate the operation of the engage members 5. The operation of the engage members 5 will now be described with reference to these figures. In FIG. 4A, the flange portions 1a of the pallet 1 are separate from the engage members 5 and the engage members 5 remain in their original state at a point of time whereat the pallet 1 placed on the elevator 3 starts to be elevated upwardly.

Figure 4B:
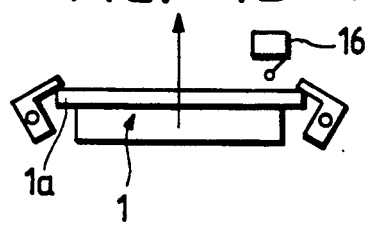
Figure 4C:
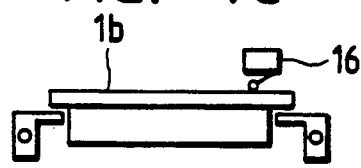
Figure 4D:
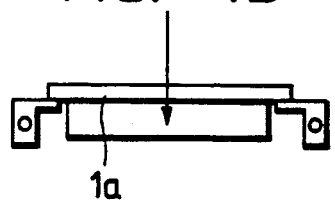

Next, when the pallet 1 continues to be further elevated upwardly, as shown in FIG. 4B, the engage members 5 are pivotally moved by the flange portions 1a of the pallet 1. When the pallet 1 continues to be further elevated upwardly, the engage members 5 are released from their state in which they are pivotally moved by the flange portions 1a of the pallet 1 and thus, as shown in FIG. 4C, the flange portions 1a come to lie above the engage members 5 and the limit switch 16 is brought into its ON state by the upper surface of the flange portions 1a. When the elevator 3 is lowered thereafter, the flange portions 1a are carried by the engage members 5, as shown in FIG. 4D.

That is, the engage members 5 are provided with no drive source, and instead, the pallet 1 is adapted to be carried by the engage members 5 with the aid of the vertical movement of the elevator 3.

On the other hand, the upper surfaces of the set of engage hooks 6 and the upper surfaces of the engage members 5 are made substantially flush with each other so that the flange portions 1a of the pallet 1 can be slidably guided and moved by the robot hand 15h which will be described later. After the pallet 1 has been moved onto the upper surfaces of the set of engage hooks 6, the elevator 3 is elevated and after the process of FIGS. 4A-4D, the elevator 4 begins to be elevated and the pallet 1 moved from the elevator 3 onto the engage hooks 6 is transferred onto the elevator 4 and at the same time, the limit switch 15 positioned above the engage hooks 6 becomes ON. In this state, the solenoids 7 are driven to retract the engage hooks 6, whereby the carried condition of the pallet is released and at the same time, the elevator 4 is lowered and when the pallet 1 now placed on the elevator 4 arrives at a position below the engage hooks 6, the lowering of the elevator 4 is stopped.

The motor operation time for lowering the elevator 4 is determined by a preset counter in the controller 30.

(2) Description of the Operation of the Apparatus

Figure 5B:
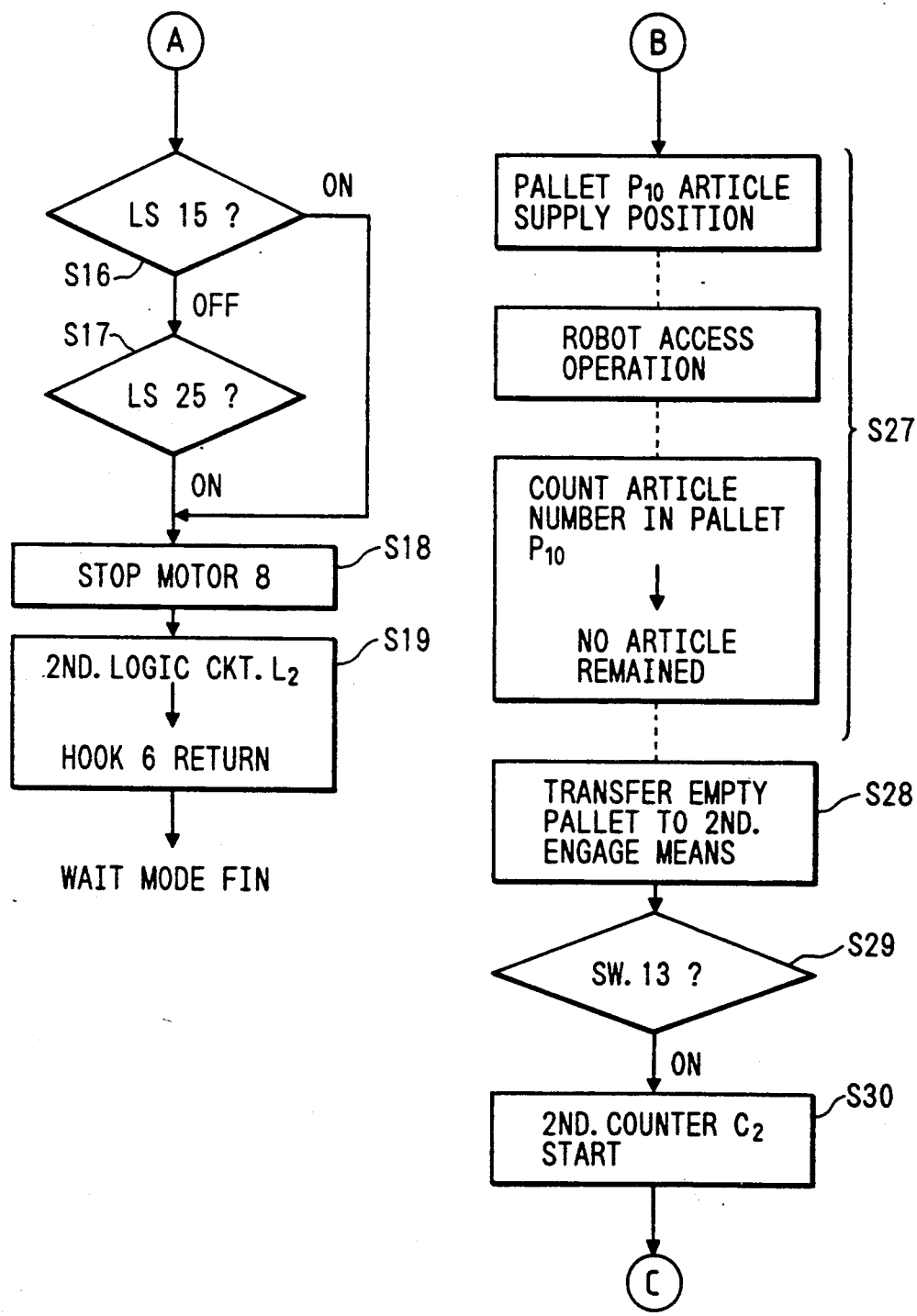
FIG. 5 is a flow chart.
Figure 5C:
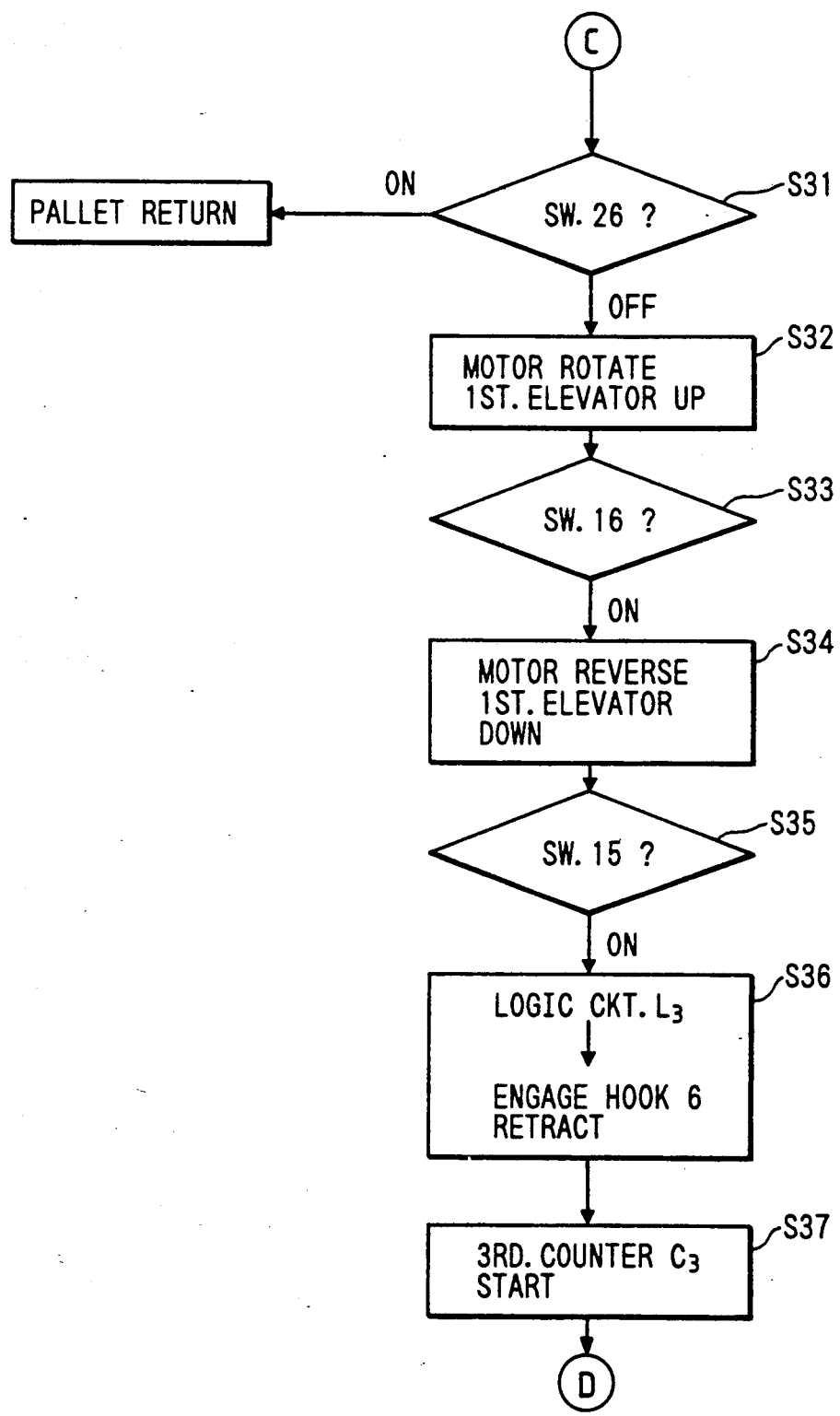

The operation of the aforedescribed apparatus will hereinafter be described with reference to the flow chart of FIG. 5 and the block diagram of FIG. 6.

When at a step S1, the body 2 is moved and positioned on the moving rail 17, automatic connection to the power supply plug 24 for supplying electric power from the moving rail is made and the power source of the body 2 becomes ON and the LED display device 20 is turned on, whereby it is confirmed that the automatic connection has been made and at the same time, the operation of the controller 30 is started.

Advance is then made to a step S2, where the operator judges the placement of the pallets 1 onto the elevator 3 and operates the mode switch 35, thereby selecting the elevator 3 to one of the access mode, the up mode and the down mode.

There is a preparatory mode for supplying the pallets containing articles therein to the body 2. Although not shown, this operation can be performed at a discrete location whereat the power source 24 can be supplied by a connection similar to that shown in FIG. 1.

(2-1) Description of the Preparatory Mode

The preparatory mode refers to a mode in which there is no pallet loaded with articles on the first elevator 3 for pallet supply and the first elevator 3 is moved to a preparatory position for loading the first elevator 3 with loaded pallets.

When at a step S11, the mode switch 35 is operated to the position of the preparatory mode, the preparatory mode LED of the display device 20 is turned on by the LED indication circuit 20A in the controller 30 of FIG. 6 to inform the operator of the preparatory mode: a step S12 (preparatory mode display). Subsequently, when at a step S13, the operation switch SW34 is depressed, the ON signal of the operation switch SW34 and the preparatory mode signal, i.e., Ready signal, from the preparatory mode display device 20A are input to the first logic circuit L1, and the solenoids 7 are operated by the signal from the first logic circuit L1 to thereby retract the engage hooks 6 of the second pallet holding means. This operation is a safety operation for permitting the lowering of the first elevator 3 even when any pallets in the last operation cycle remain on the second elevator 4.

At a step S15, after the retraction of the engage hooks 6, a signal $8a_1$ (CCW) for lowering the first elevator 3 is output from the motor control circuit 8A by the preparatory mode signal and the ON signal of the operation switch SW34 to operate the motor 8, whereby the first elevator 3 is lowered. If any empty pallet remains on the second elevator 4, the switch SW15 of the empty pallet detecting means is closed by the empty pallet. The motor control circuit 8A in the controller 30 outputs a stop signal for the motor 8 by the ON signal of the switch SW15.

If there is no empty pallet on the second elevator 4, the first elevator 3 is lowered to the lowermost position, and at a step S17, it closes the switch SW25 of the lowermost position detecting means for the first elevator 3, and the motor 8 is stopped by this ON signal (a step S18).

After the motor 8 is stopped at the step S18, the preparatory mode selection signal and the ON signal of the switch SW25 of the lowermost position detecting means for the first elevator 3 are input to the second logic circuit L2, and with the aid of the output from this logic circuit L2, the second engage hook 6 is returned to its original position by the solenoid 7 (a step S19).

In the terminated state of the step S19, the preparatory mode is completed, and in this state, the first elevator 3 is in its lowermost position and therefore, pallets loaded with articles can be loaded from a pallet conveying bed, not shown. In the present embodiment, there is shown a case where ten pallets loaded with articles are piled. These pallets are indicated by $P_1, P_2, \ldots, P_{10}$ from below.

(2-2) Description of the Access Mode

The access mode refers to a mode in which pallets loaded with articles are piled on the first elevator 3 and the robot 150 can pick up the articles and perform the operation of assembling or working them.

When the mode selecting means 35 is selected to the access mode, the access mode is displayed through the indication circuit 20A (a step S22). When the access mode is selected and there is no loaded pallet on the first engage means, i.e., the engage members 5 at the article supply position, the articles cannot be picked up by the robot. Therefore, when there is no pallet on the engage members 5, the switch SW16 of the pallet detecting means at the article supply position becomes OFF. The access mode selection signal (the Acess signal) and the OFF signal of the switch SW16 are input to the motor control circuit 8A to thereby rotate the motor 8 until the switch SW16 becomes ON (a step S23). The first counter $C_1$ connected to the motor control circuit 8A receives the ON signal of the switch SW16 and the access mode selection signal as inputs and starts counting and further rotates the motor 8 in the reverse direction by these input signals (a step S24), and the uppermost pallet $P_{10}$ on the first elevator 3 is engaged by the first engage member 5 (a step S25), and the second loaded pallet $P_9$ from above is lowered to the next pallet supply position (a step S26). The time for which the motor 8 is rotated in the reverse direction is determined by the output signal $C_{a1}$ after the counting of a predetermined time by the first counter $C_1$ being input to the motor control circuit 8A, and the motor is stopped. In this state, the robot 150 becomes ready to access. The number of the loaded pallets piled during the preparatory mode is varied by the kind of the machine assembled or worked, the number of assemblies or the like, and ten pallets $P_1$-$P_{10}$ are not always piled during the preparatory mode.

When the count terminating time of the first counter $C_1$ elapses, the robot 150 can perform the operation of assembling or working the articles in the pallet $P_{10}$ which is at the article supply position and therefore, a count-out signal $C_a$ is output from the first counter $C_1$ and this provides an access starting signal to the robot (a step S26). By the access starting signal $C_a$ being output, the robot picks up the articles in the pallet $P_{10}$ successively and assembles or works them (a step S27). The number of articles in the pallet $P_{10}$ picked up by the robot is counted by a counter, not shown, on the robot side, and when the number of articles remaining in the pallet $P_{10}$ becomes zero, the empty pallet $P_{10}$ is pushed out onto the engage hooks 6 of the second engage means by the robot hand 150h. (a step S28). When the empty pallet $P_{10}$ is fed to the location of the engage hooks 6, i.e., the discharge position for the empty pallet $P_{10}$, the switch SW13 of the means for detecting the presence of an empty pallet outputs an ON signal by the empty pallet $P_{10}$ (a step S29).

(2-3) Description of the Access Mode of the Second Pallet $P_9$

When the switch SW13 becomes ON, the second loaded pallet $P_9$ which is now at the uppermost position on the first elevator 3 enters the mode in which it accesses to the robot. In the present embodiment, the access completion time of the second loaded pallet $P_9$ is determined so as to terminate within a predetermined time. This access completion time is determined by the counting by the second counter $C_2$ in the controller of FIG. 6.

(Judgement of the propriety of the lowering of the second elevator—for the elevation of the second pallet)

Accordingly, the second counter $C_2$ starts counting by the ON signal of the switch SW13 (a step S30). Advance is then made to a step S31, where whether the lowering of the second elevator 4 is possible is judged by the switch S26 of the lower-most position detecting means for the second elevator 4. That is, when empty pallets are piled on the second elevator 4 and the second elevator 4 is in its lowermost position, the first elevator 3 cannot be elevated. In such case, it is necessary to collect the empty pallets on the second elevator 4 and return the mode to the aforedescribed preparatory mode.

(Elevation of the second pallet)

When the switch SW26 is OFF at the step S29, a motor rotation control signal for elevating the second loaded pallet $P_9$ by the OFF signal of the switch SW26 and the ON signal of the switch SW13 is input to the motor control circuit to thereby elevate the first elevation 3 (a step S32).

By the elevation of the first elevator 3, the second pallet $P_9$ closes the switch SW16 of the article supply position detecting means for the loaded pallet (a step S33). The motor 8 is rotated in the reverse direction by the ON signal of the switch SW16, whereby the first elevator 3 is lowered and the second elevator 4 is elevated (a step S34). Due to this lowering of the first elevator 3, the second pallet $P_9$ is engaged by the first engage means 5. Due to the elevation of the second elevator 4, the switch S15 of the empty pallet position detecting means outputs an ON signal by the empty pallet on the second elevator 4 (a step S35).

(Reception of an empty pallet)

The ON signal of the switch SW15 and the access mode signal from the mode selecting means 35 are input to the logic circuit L3 and the hooks 6 of the second engage means are retracted by the solenoids 7 (a step S36). Also, the ON signal of the switch SW15 reverses the rotation of the motor 8 to lower the second elevator 4 and elevate the first elevator 3 (a step S36). During this lowering of the second elevator 4, the empty pallet $P_{10}$ is transferred onto the second elevator 4.

The third counter $C_3$ starts counting by the ON signal of the switch SW15 at the step S34 (a step S37). The third counter $C_3$ sets the time for the lowering of the second elevator 4 by the reverse rotation of the motor 8 from the start of ON of the switch SW15. The count time $T_3$ of the third counter $C_3$ is set to the time from after the empty pallet $P_{10}$ is transferred onto the elevator 4 until the elevator 4 is moved to a position lowered by an amount corresponding to a pallet. When the third counter $C_3$ finishes counting a predetermined time, the second counter $C_2$ which has been counting since the step S28 is reset by the output $t_3$ from the third counter $C_3$. (a step S40).

(2-4) Description of the Trouble Discrimination Mode

The second counter $C_2$ starts counting from the step S28 and is reset by the output $T_3$ of the third counter $C_3$, but when there is a trouble in the article supplying operation of the second pallet $P_9$ or the process of transferring the empty pallet $P_{10}$, for example, when the pallets $P_1$-$P_9$ are not properly piled, the switch SW16 will not become ON for ever and a normal operation will not be performed. In such a case, it is necessary to effect an alarming operation and output an alarm signal. For this purpose, trouble is discriminated when the signal for resetting the second counter $C_2$ is not input within a predetermined time. In the present embodiment, the output signal $T_3$ of the third counter $C_3$ is the reset input for the second counter $C_2$, and a reference signal $T_{pa}$ corresponding to the reference time $T_p$ in the case of a normal state and the counted time by the second counter $C_2$ are input to comparing means $Comp_1$, whereby comparison is effected (a step S43). If the reset signal from the third counter $C_3$ is input within the reference time, 0 signal is output from the comparing means $Comp_1$. If the reset signal from the third counter $C_3$ is input beyond the reference time, 1 signal is input from the comparing means $Comp_1$ to alarm means 160 and an alarm mode is displayed by the display device 20 (a step S44). When in the comparison of the count by the second counter $C_2$ at the step S43, the resetting of the second counter $C_2$ is effected within a predetermined time and the pallet supply state is judged to be normal, the 0 signal of the comparing means $Comp_1$ is sent to the robot 150 side and articles begin to be picked up from within the second pallet $P_9$ which is at the article supply position (a step S41).

(b 2-5) Description of the Up Mode of the First Elevator 3

The operation of the access mode described in item 2-4) above progresses, and the loaded pallets $P_1$-$P_7$ become empty and are successively transferred onto the second elevator 4. Where a plurality of pallet suppliers of the present embodiment are arranged and the assembling or working operation by the robot is to be performed, it is conceivable that deficiency of pallets is caused when loaded pallets are to be supplied to a certain supplier. Therefore, in the present apparatus, there is provided a mode in which the lowering of the second elevator 4 can be effected so that empty pallets on the second elevator 4 can be arbitrarily taken out.

At a step S46, the mode selecting means 35 is selected to the up mode (the empty pallet taking-out mode) and the display device displayes the up mode (a step S47).

At a step S48, the operation switch SW34 is depressed, and at a step S49, the signal of the operation switch S34, the up mode selection signal and the signals of the switch SW16 of the pallet detecting means at the article supply position and the switch SW26 of the lowermost position detecting means for the second elevator 4 are input to the logic circuit L4. In this logic circuit L4, whether the lowering of the second elevator 4 is possible is discriminated, and if the lowering is judged to be possible by the logic circuit L4, a motor driving signal is output from this logic circuit to the motor control circuit 8A, whereby the second elevator 4 is lowered (a step S50). When one of the switches SW16 and SW26 becomes ON, a signal indicative of the impossibility of the lowering of the second elevator 4 is output from the logic circuit L4 to stop the driving of the motor (a step S51).

With the above-described lowering of the second elevator 4, the empty pallets on the second elevator 4 can be discharged. That is, discharge of the empty pallets is smoothly accomplished by setting the lowermost position of the second elevator 4 as the connected position of an empty pallet discharge truck, not shown.

2-6) The Down Mode of the First Elevator for Taking Out Loaded Pallets in the Course of Operation There is a case where a new machine to be assembled or worked is introduced while several loaded pallets on the first elevator 3 contain articles for assembling a different machine. In such case, there occurs the necessity of replacing the articles contained in the pallets on the first elevator 3 with articles for assembling the new machine. For that purpose, the first elevator 3 is lowered. The down mode is selected by the mode selecting means 35 (a step S52) and the down mode is displayed by the display device 20 (a step S53). The operation switch 34 is then depressed (a step S54). The signal of the operation switch 34 and the down mode selection signal are input to the logic circuit L5, and the solenoids 7 are electrically energized by the signal from the logic circuit L5, whereby the engage hooks 6 of the second engage means are retracted (a step S55). Thus, the second elevator 4 becomes capable of being elevated even with the pallets 1 remaining piled thereon.

Subsequently, the down mode selection signal, the operation switch signal, the signal of the switch SW15 of the empty pallet detecting means and the signal of the switch SW25 of the lowermost position detecting means for the first elevator 3 are input to the logic circuit L6, whereby whether the lowering of the first elevator 3 is possible is judged (a step S56). If the lowering of the first elevator 3 is judged to be possible by the logic circuit L6, a motor driving signal is output from the motor control circuit 8A, whereby the first elevator 3 is lowered (a step S57). The motor is stopped by the ON signal of the switch SW25 or SW15 (a step S58).

As described above, the present invention can provide an apparatus in which first elevator means 3 for supplying pallets loaded with articles to an article supply position and second elevator means 4 for discharging empty pallets are seesaw-moved by driving means 8, 8A, 9 to thereby supply the articles to a robot and the elevation and lowering of said first and second elevator means are controlled by means for detecting the positions of said first and second elevator means, whereby the supply of the articles by the pallets and the discharge of the empty pallets can be accomplished smoothly and efficiently.

Also, the present invention can provide an apparatus in which the driving of said driving means is suitably effected by the signal of said detecting means and the signal of each mode selecting means to thereby prevent the speeding of each elevator means and prevent the retardation of the robot's operation of picking up the articles in the pallets.

Also, in the present invention, the time during which said seesaw-moved first elevator is lowered after an article-loaded pallet on said first elevator is engaged with first engage means at the article supply position to the robot is controlled by a counter $C_1$ so that the engaged position of the next loaded pallet may be determined by the time counted by said counter $C_1$, whereby accurate control of the engaged position can be accomplished.

Further, in the present invention, the time during which the number of articles remaining in a pallet lying at the article supply position becomes null and the next loaded pallet is moved to the article supply position and the access to the robot is again effected is counted by a counter $C_2$ and therefore, an accurate access time can be obtained.

According to the present invention, in a supplier wherein a first elevator for supplying articles to an article supply position and a second elevator for discharging empty pallets are moved in a seesaw-like fashion to thereby effect the article supply by the pallets and the discharge of the empty pallets, the time of movement of the pallets is controlled as means for detecting any abnormality of the conveyance of the pallets, whereby accurate detection of any abnormal state is made possible.

That is, according to the present invention, a counter $C_2$ performing its counting operation by means SW13 for detecting the presence of an empty pallet at a discharge position and a third counter $C_3$ for controlling the lowering time of the second elevator on the discharge side are provided so that the counting of the count value by the counter $C_2$ may be stopped by the count termination time of the third counter $C_3$ and the time from after the detection of an empty pallet until the completion of the transfer of the empty pallet onto the second elevator may be counted by the second counter $C_2$, whereby whether the discharge of the empty pallet has been effected within a normal time is discriminated, and in the event of abnormality, an alarm (signal) is produced and therefore, the mistake of overlooking the abnormal state of the article supply operation for a long time can be prevented.

Figure 7A:
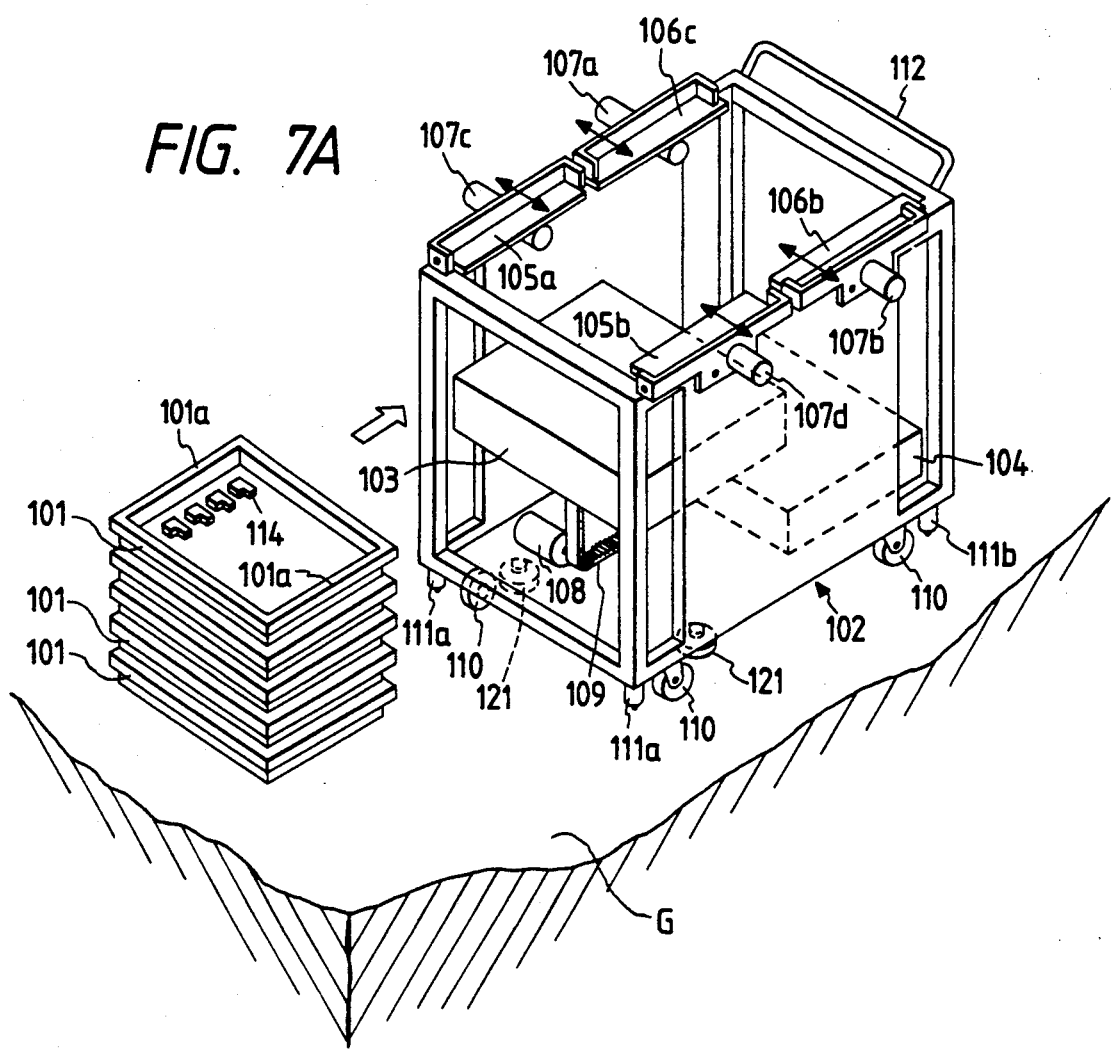
FIG. 7A is a pictorial perspective view of the positioning structure of the pallet supplier of the present invention.

Another embodiment of the present invention will hereinafter be described in detail with reference to the drawings. FIG. 7A shows a pictorial perspective view of the positioning structure of the pallet supplier of the present invention. In FIG. 7A, there are shown pallets 101 in which a number of workpieces 114 are contained. In FIG. 7A, the pallets 101 are piled on the floor surface G as shown, and elevators 103 and 104 for elevating and lowering such piled pallets 101 are provided within the body 102 of the positioning structure of the pallet supplier. The pallets 101 as they are piled as shown may be placed onto the supporting surface of the elevator 103 by the man power of the operator or by an inserting mechanism constructed as a discrete body.

A main motor 108 for driving these elevators 103 and 104 upwardly and downwardly is fixed on the bottom surface of the body 102, and a timing belt 109 is in meshing engagement with the motor 108 as shown so that the elevator 103 may be elevated and the elevator 104 may be lowered, by the rotation of the motor 108 through the timing belt 109.

A set of engage hooks 105a and 105b and a set of engage hooks 106a and 106b which are in a positional relation for engaging the flange portions 101a of the pallets 101 are provided on the opposite edge portions of the upper surface of the body 102 for movement in the directions of arrows, and these engage hooks are provided with solenoids or motors 107a, 107b, 107c and 107d for moving the engage hooks in and out. A state in which these engage hooks engage the flange portions 101a of the pallets 101 and a state in which the engage hooks do not engage the flange portions 101a are created by the movement of the engage hooks so that the movement of the pallets 101 from the elevator 103 onto the elevator 104 may be accomplished.

Four casters 110 for running on the ground and two casters 121 for horizontal guide indicated by broken lines are provided at the four corners of the bottom surface of the body 102, as shown. On the bottom surface of the body 102, ball casters 111a and 111b for coupling-positioning with an instrument 117 such as a working machine or an assembling machine which will be described later are disposed at the corner portions of the bottom with a level difference provided as will be described later.

A handle 112 is provided on the right edge portion of the upper surface of the body 102 so that the body 102 can be easily moved by the use of this handle 112.

Figure 7B:
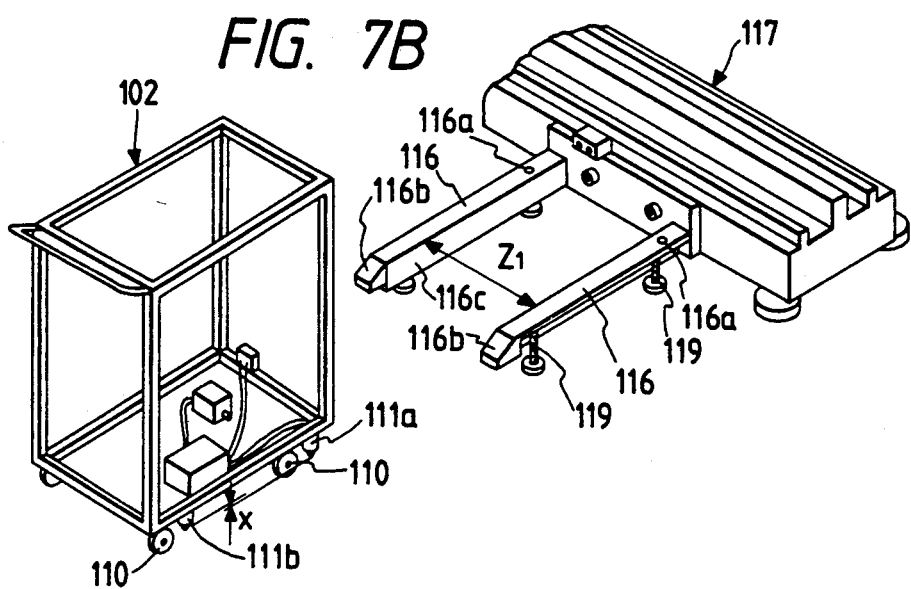
FIG. 7B is a perspective view of the positioning structure of the pallet supplier when it is provided on an instrument 117.
Figure 7C:
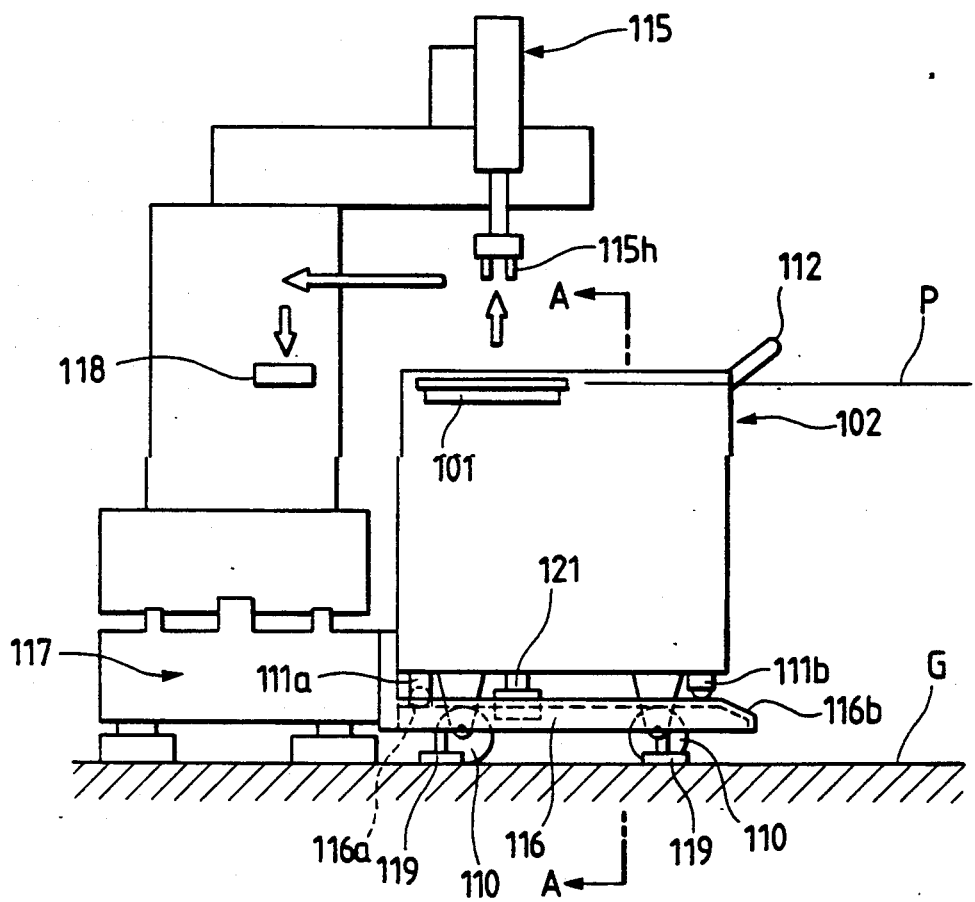
FIG. 7C is a side view showing the state after a body 2 is joined to the positioning structure of the pallet supplier shown in FIG. 7B.

FIG. 7B is a perspective view showing the positioning structure of the pallet supplier when it is provided to the instrument 117, and FIG. 7C is a side view showing the state of the body 102 after it is joined to the positioning structure of the pallet supplier. In these figures, a robot 115 having a robot hand 115h mounted thereon is movably provided on top of the instrument 117 so that the workpieces contained in the pallets 101 may be moved onto a working jig pallet 118 by the robot hand 115h as indicated by the arrow to thereby effect the assembling work.

On the other hand, a pair of substantially L-shaped position frames 116 are provided on a side of the instrument 117, as shown, and each of these position frames 116 is formed with an engagement aperture 116a at a location corresponding to each of the aforementioned ball casters 111a so that in a state in which the body 102 is moved and set at its shown position, the ball casters 111a may be engaged with the engagement apertures 116a to thereby accomplish positioning automatically.

Figure 7D:
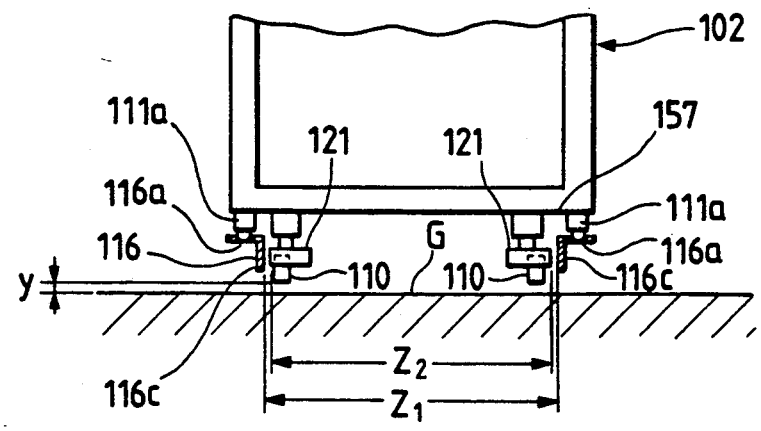
FIG. 7D is a cross-sectional view taken along line A—A of FIG. 7C.

FIG. 7D is a cross-sectional view taken along line A—A of FIG. 7C and showing the manner in which positioning is effected by the above-mentioned two casters 121 for horizontal guide. That is, in FIG. 7D, the position frames 116 are disposed on the instrument 117 while keeping a spacing $Z_1$ prescribed by the inner peripheral surfaces 116c of the position frames 116, but are provided on the body 102 in such a manner that the spacing between the outer peripheral surfaces of the two casters becomes a dimension $Z_2$ somewhat smaller than the spacing $Z_1$.

Accordingly, when the body 102 is moved to the space between the position frames 116 by gripping the handle 112 of the body 102, the outer peripheral surfaces of the casters 121 are guided by the inner peripheral surfaces 116c of the position frames 116 and thus, the horizontal automatic positioning of the body 102 is accomplished. Instead of the casters 121, sliders may be provided on the opposite sides of the body 102 so that the above-described guiding operation may be accomplished.

On the other hand, in such automatically positioned state, the casters 110 are guided after the ball casters 111a and 111b ride onto the running surfaces of the position frames 116 and therefore, the casters 110 float up from the floor surface G by a dimension y.

Figure 7E:
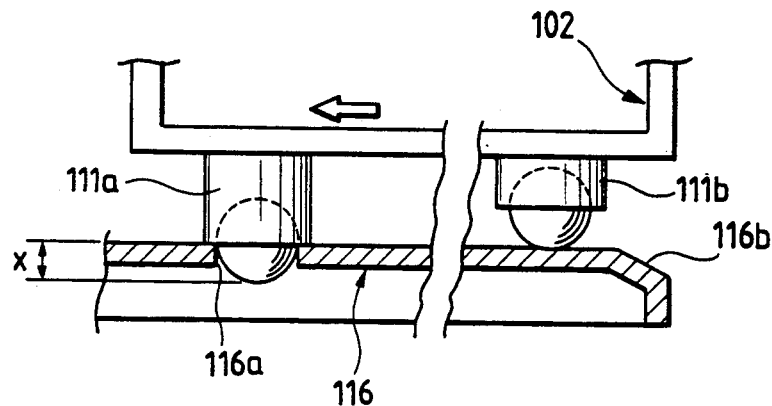
FIG. 7E is an enlarged view, partly in cross-section, showing ball casters 111a and 111b as they are engaged with a position frame 116.
Figure 8:
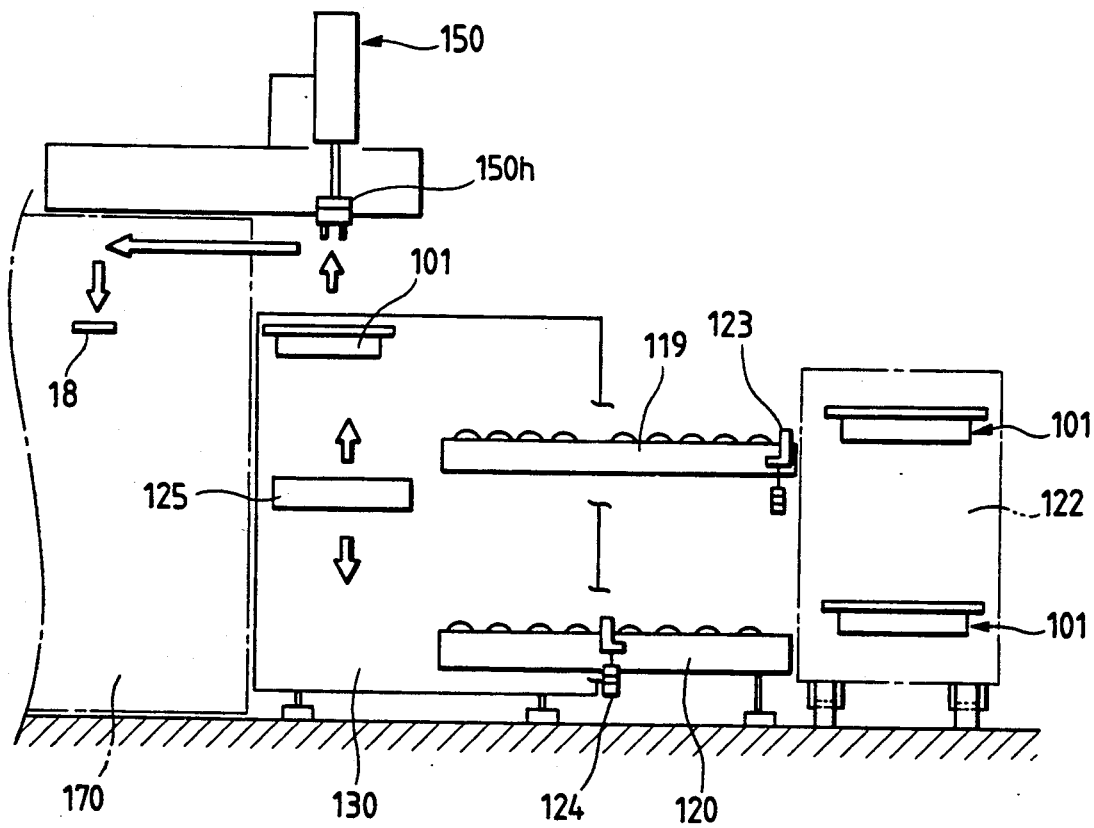
FIG. 8 is a side view showing an example of the construction of the pallet supplier according to the prior art.

FIG. 7E is an enlarged view, partly in cross-section, showing a state in which the ball casters 111a and 111b are engaged with the position frame 116.

In FIG. 7E, the outer peripheral surfaces of the rotational balls of the ball casters 111a and 111b are disposed with a level difference x as shown being secured relative to the body 102, and when the body 102 is moved in the direction of the arrow, the rotational ball of the ball caster 111a first rides onto the inclined surface 116b of the position frame 116. When the body 102 is further moved in the direction of the arrow from this state, the casters 110 float up from the floor surface G as shown in FIG. 7D and thus, the body is guided on the position frames 116 by the ball caster 111a, and finally the ball caster 111a falls into the engagement aperture 116a, whereby the automatically positioned state is brought about, and at this time, the ball caster 111b also rides onto the inclined surface 116 of the position frame 116, whereafter it is positioned on the position frame 116.

In this automatically positioned state, the supporting surfaces P of the pallets 101 and the floor surface G become substantially parallel to each other due to the level difference x.

As described above, the body which functions as a supply vehicle for the pallets is automatically positioned relative to the instrument and the article supporting surfaces of the pallets and the floor surface becomes horizontal and therefore, the next process is not adversely affected and moreover, positioning can be accomplished automatically and thus, it is possible to realize the positioning structure of a pallet supplier which is easy to operate.

As has hitherto been described, according to the positioning structure of the pallet supplier of the present invention, the supporting surfaces of the pallets are made substantially horizontal and the next process is not adversely affected and moreover, positioning can be effected automatically to thereby make the operation easy.

What is claimed is:

1. An apparatus for supplying articles, comprising:

first elevator means for raising and lowering at least one pallet loaded with articles;
second elevator means for raising and lowering at least one empty pallet;
driving means for driving said first and second elevator means, said driving means including a reversible motor for simultaneously driving said first and second elevator means in opposite directions;
first holding means for supporting a pallet raised by said first elevator means at a supply position;
second holding means for supporting an empty pallet to be lowered by said second elevator means;
first detecting means for detecting the presence of a pallet supported on said first holding means and outputting a signal;
second detecting means for detecting the presence of an empty pallet on said second holding means and outputting a signal;
third detector means for detecting if said second elevator can be lowered and outputting a signal;
transferring means for transferring an empty pallet on said first holding means to said second holding means; and
supplying means for supplying the pallet on said first elevator to said first holding means, said supplying means driving said first elevator means upwardly toward said first holding means on the basis of output signals from said second and third detecting means in a first operation, and driving said first elevator means downwardly on the basis of an output signal from said first detecting means in a second operation.

2. An apparatus according to claim 1, further comprising fourth detecting means for detecting the output signal of said first detecting means within a predetermined period after starting the first operation, wherein an abnormality is signalled by said fourth detecting means if it does not detect the output signal of the first detecting means within the predetermined period.

* * * * *

UNITED STATES PATENT AND TRADEMARK OFFICE
CERTIFICATE OF CORRECTION

PATENT NO. : 5,190,434
DATED : March 2, 1993
INVENTOR(S) : Toshihiko Miura, et al It is certified that error appears in the above-indentified patent and that said Letters Patent is hereby corrected as shown below:

Column 10 line 31, "$t_3$" should read --$T_3$--.

Column 15 line 19, "detector" should read --detecting--.

Signed and Sealed this

Second Day of November, 1993

*Attest:*

BRUCE LEHMAN

*Attesting Officer*     Commissioner of Patents and Trademarks